July 28, 1959

M. HUGUENIN 2,896,759

COUPLING DEVICE INCORPORATING A FREE WHEEL
MECHANISM CHIEFLY FOR USE IN TIME-PIECES

Filed April 13, 1953

United States Patent Office 2,896,759
Patented July 28, 1959

2,896,759

COUPLING DEVICE INCORPORATING A FREE WHEEL MECHANISM CHIEFLY FOR USE IN TIME-PIECES

Marc Huguenin, Geneva, Switzerland, assignor to Montres Rolex S.A., Geneva, Switzerland Application April 13, 1953, Serial No. 348,399

Claims priority, application Switzerland July 25, 1952

5 Claims. (Cl. 192—46)

The present invention has for its object a coupling device incorporating a free wheel mechanism adapted for use more particularly in time-pieces, said coupling device including two coaxial parts, to wit, a driving part and a driven part, that are connected by means of a movable connecting member.

According to a main feature of the invention, one of the coaxial parts includes a wheel provided with an annular recess inside which is housed a ratchet rigid with said wheel while the connecting member is constituted by an arcuate catch lying in the same recess and terminating with two noses, one of which noses at least may engage the teeth of the ratchet, the catch being provided, furthermore, along its outer surface with a boss located between the two noses and engaging the side wall of said recess so that the contact point between the boss and said wall forms an instantaneous center of rotation for the catch, a point of which is angularly rigid with the second coaxial part while it is adapted to be shifted radially to a slight extent with reference thereto, Accompanying drawings illustrate by way of example several embodiments of the object of the invention. In said drawings:

Figure 1:
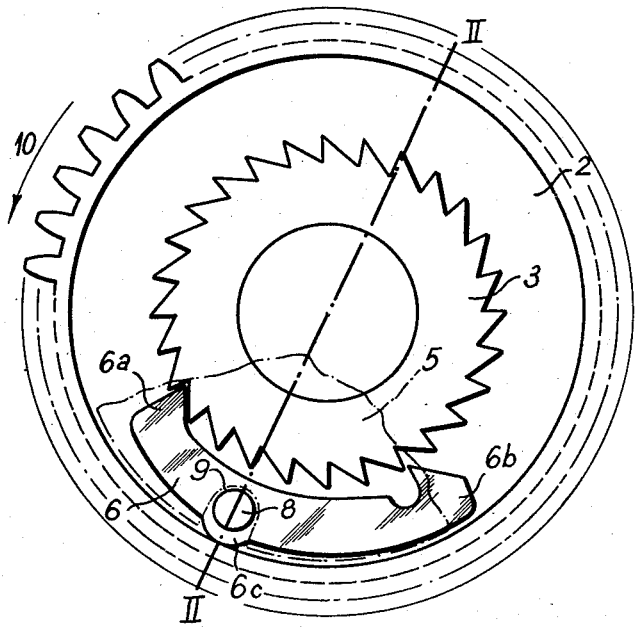
Fig. 1 is a plan view of a part of a first embodiment of which a portion has been removed.
Figure 2:
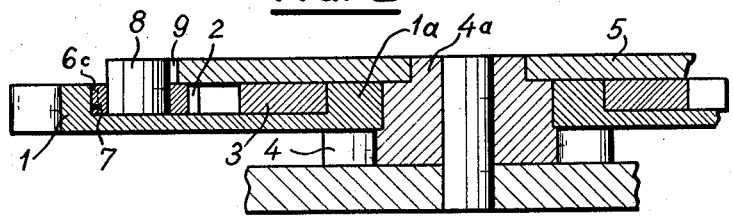
Fig. 2 is a cross-section through line II—II of Fig. 1.

The coupling device illustrated in Figs. 1 and 2 includes a wheel 1 inside a terminal surface of which is formed an annular recess 2 housing a ratchet wheel 3 fitted tightly over the hub 1a of the wheel 1. Said wheel and said ratchet 3 form one of the coaxial component parts of the coupling device, the second component part of which is constituted by a pinion 4, on the hub 4a of which may revolve freely the wheel 1 through engagement of the hub 1a thereof over the periphery of said hub 4a. Said hub 4a carries a disc or plate 5 that is tightly fitted over it and that overlies the outer surface of the ratchet wheel 3 and extends beyond the latter above the outer portion of the annular recess 2. Said recess serves for housing also a catch 6 assuming an arcuate shape and terminating with two noses at its opposite ends 6a and 6b for cooperation with the ratchet wheel 3, the angular distance between the two noses corresponding to an integer number of teeth on the ratchet wheel plus a half-tooth interval. Said catch is provided at a point of its length with an outer boss 6c bearing against the outer lateral wall 7 of the recess 2. The contact point between the boss 6c and the wall 7 forms an instantaneous center of rotation for the catch 6. The latter carries in register with said boss a pin 8 engaging a radial notch 9 in the plate 5 carried by the pinion 4. By reason of this arrangement, the pin 8 is slidable radially with respect to plate 5 and the plate 5 is angularly rigid with the catch 6, but the radial stresses to which the latter may be submitted are not transmitted to the plate. These stresses are absorbed by the wall 7 of the wheel 1 and, as they cannot be produced otherwise than through the action of the ratchet 3 on the catch, they are irrelevant as the ratchet is in one with said wheel.

The arrangement described operates as follows: when the wheel 1 is driven in the direction of the arrow 10 (Fig. 1), the radial surfaces of the teeth of the ratchet wheel 3 engage either of the noses 6a and 6b and drive the catch 6 around the axis of the device. The catch 6 drives in its turn the plate 5 rigid with the pinion 4. If, on the contrary, the wheel 1 is driven in a direction opposed to that of the arrow 10, the noses 6a and 6b ride over the teeth of the ratchet wheel 3 so that the catch 6 is not driven and executes merely a very slight angular reciprocation.

It should be remarked that the two parts of the coupling device may serve indifferently as driving and as driven parts. This coupling device is advantageously incorporated in automatic watch winding systems; the association of two similar coupling devices may allow producing, in particular in watches including a rotary winding up-mass, a reversing arrangement through the agency of which the winding may be performed for both directions of oscillation of said rotary mass.

Figure 3:
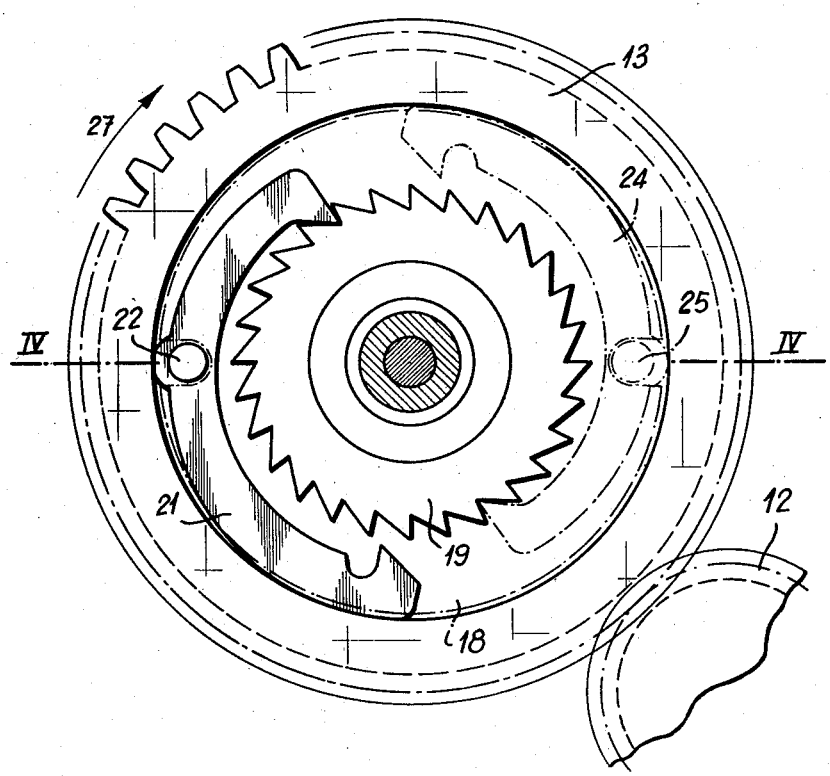
Fig. 3 is a horizontal sectional view of an example of application of the coupling device according to the present invention, said sectional view passing through line III—III of Fig. 4.
Figure 4:
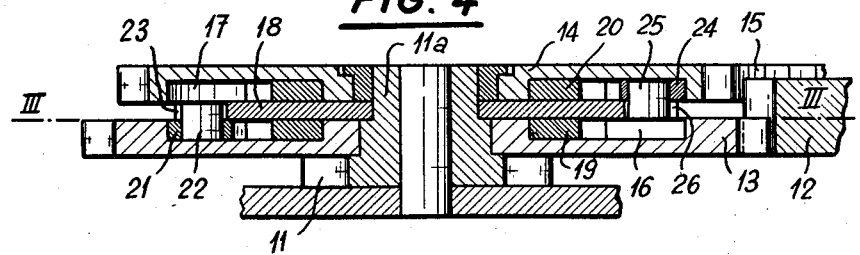
Fig. 4 is a cross-sction through line IV—IV of Fig. 3.

In the embodiment illustrated in Figs. 3 and 4, there is shown a reversing device for an automatic watch winding system, i.e. an arrangement through which the driven member, to wit the pinion 11, revolves constantly in the same direction whatever may be the direction of rotation of the watch-winding mass. The latter, which is not illustrated, is rigid with a toothed wheel 12 which controls directly a wheel 13 forming part of the reversing device, said wheel 12 controlling also a wheel 14 forming part of the same reversing device through the agency of a transmission 15 illustrated diagrammatically in Fig. 4. The wheels 13 and 14 are thus adapted to revolve selectively in either direction according to the direction of rotation of the mass, the two wheels revolving in both cases in opposite directions. Each of them is provided with an annular recess 16 or 17, both recesses facing a plate 18 mounted between the two wheels and fitted tightly over the hub 11a of the pinion 11 forming, as stated, the driven part. The wheels 13 and 14 carry, furthermore, each a ratchet wheel 19 or 20 housed in the corresponding recess 16 or 17 and rigid with the carrier wheel 13 or 14 respectively. A catch 21 identical with the catch 6 of the first embodiment is housed inside the recess 16; its pin 22 engages a corresponding notch 23 formed in the plate 18 and a similar catch 24 is housed in the recess 17 of the wheel 14 and carries a pivot 25 directed downwardly for engagement inside a recess 26 in the plate 18. These catches 21 and 24 operate in the same manner as the catch 6 in the first embodiment. When the wheel 13 is driven in the direction of the arrow 27, the catch 21 drives the ratchet 19 in the same direction and this leads to a rotation in the same direction of the pinion 11. The wheel 14 revolves then in the opposite direction and the catch 24 rides over the teeth of the ratchet wheel 20. When the direction of rotation of the rotary mass changes, the wheel 14 is driven in the direction of the arrow 27 and drives along with it in the same direction the pinion 11 through the agency of the catch 24 and of the ratchet 20, while the wheel 13 revolves in the opposite direction so that the catch 21 rides over the teeth of the ratchet wheel 19.

Figure 5:
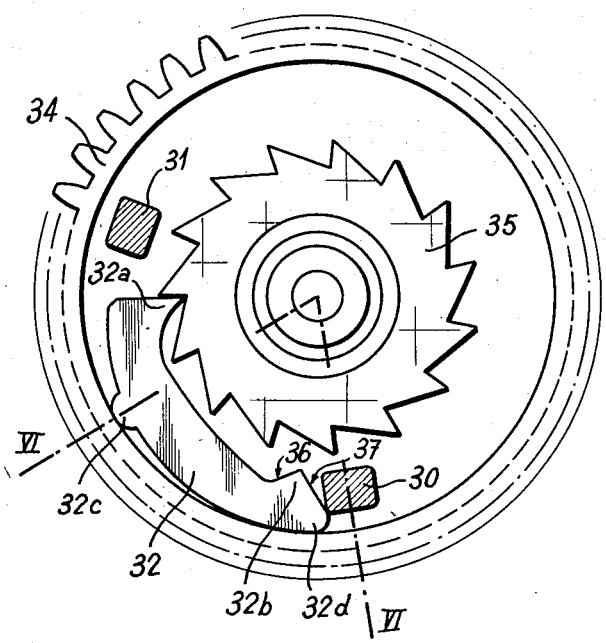
Fig. 5 is a plan view of a second embodiment.
Figure 6:
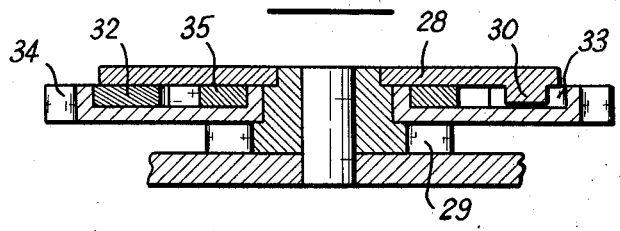
Fig. 6 is a cross-section through line VI—VI of Fig. 5.

In the modification illustrated in Figs. 5 and 6, the plate 28 which forms with the pinion 29 one of the component parts of the coupling device carries two pins 30 and 31 located to either side of a catch 32 housed in an annular recess 33 formed in the wheel 34 constituting with the ratchet wheel 35 rigid therewith, the other component part of the coupling device. These two pins 30 may be obtained in the stamping of the plate 28. The catch 32 is provided with two noses 32a and 32b and with an outer boss 32c adapted to engage the outer side wall of the recess 33. The nose 32a alone serves for the driving while the nose 32b has an oblique surface 36 adapted to cooperate with the tips of the successive ratchet teeth so as to return the catch into its normal position whenever the nose 32a is released. During free wheel operation, the catch 32 executes consequently a very slight and continuous reciprocating movement. It should be remarked that the outer surface 37 of the catch adjacent to the nose 32b and cooperating with the pin 30 is oblique so that the action of said pin urges the tail end 32d of the catch against the outer lateral surface of the recess and consequently also urges the nose 32a at the other end of the catch against the teeth of the ratchet wheel 35.

What I claim is:

1. A free-wheel coupling device, chiefly for timepieces, comprising a first revoluble component member provided with an annular recess, a ratchet wheel rigidly secured inside said recess coaxially therewith, at least one catch including at its ends noses adapted to engage the teeth of the ratchet wheel, said catch being adapted to pivot freely through its medial part against the outer wall of the annular recess, a second component part coaxial with the wheel and including a disc overlying the ratchet and the catch in the recess and two pins rigid with said disc and engaging the annular recess in register with the ends of the catch for engaging with the latter.

2. A free wheel coupling device chiefly for timepieces comprising a first revoluble member provided with a coaxial peripheral wall bounding an inner recess, a ratchet wheel coaxially rigid with said first member and coaxial with the recess therein, at least one slightly arcuate catch including a boss projecting outwardly of its outer surface and rockably engaging the inside of the peripheral wall bounding said recess, said catch being provided furthermore with a terminal nose adapted to engage the ratchet wheel, a second revoluble component member coaxial with the first component member and including a disc overlying the ratchet wheel and the catch, and two projections rigid with the disc and entering the annular recess to either side respectively of the catch for engagement by the ends of the latter to ensure the simultaneous progression of the first revoluble member and of the disc for that direction of rotation of the associated components for which the nose on the catch engages operatively the ratchet wheel and thereby operatively connects the disc with the latter.

3. A free wheel coupling device chiefly for timepieces comprising at least a first revoluble member provided with a coaxial peripheral wall bounding an inner recess, a ratchet wheel coaxially rigid with said first member and coaxial with the recess therein, at least one slightly arcuate catch including a rigid rounded boss integral with and projecting outwardly from its outer surface and rockably engaging the inside of the peripheral wall bounding said recess, said catch being provided with at least one terminal nose adapted to engage the ratchet wheel, a second revoluble component member coaxial with the first component member and including a disc overlying the ratchet wheel and the catch, said catch being slidable with respect to the second member and means provided partly on said disc and partly on the catch, drivingly interconnecting said disc with the catch for ensuring the simultaneous progression of the first revoluble member and of the second revoluble member and of the disc for that direction of rotation of the associated components for which the nose on the catch engages operatively the ratchet wheel and thereby operatively connects the disc with the latter.

4. A free wheel coupling device chiefly for timepieces comprising two revoluble coaxial members provided each with a coaxial peripheral wall bounding an annular recess, said recesses coaxially facing each other, a ratchet wheel rigidly secured inside each recess coaxially therewith, the teeth of the two ratchet wheels facing opposite directions, at least one catch in each recess including at least at one end a nose adapted to engage the teeth of the corresponding ratchet wheel, a rigid rounded boss integral with and projecting outwardly from the outer surface of said catch adapted to rock freely in contact with the peripheral wall of the annular recess, means constraining said coaxial members to rotate in opposite directions, a second revoluble member coaxial with the ratchet wheels and including a disc revolubly fitted between the recesses in the first mentioned coaxial members, said catch being free from direct interconnection with said second member and means arranged partly on said disc and partly on each catch, drivingly interconnecting the disc with either catch for ensuring the simultaneous progression of the disc and of the recessed revoluble member carrying the catch for which the direction of rotation of the associated components engages the nose on said catch operatively with the corresponding ratchet wheel and thereby operatively connects the disc with the latter.

5. A free wheel coupling device chiefly for timepieces comprising a first revoluble member provided with a coaxial peripheral wall bounding an annular recess, a ratchet wheel coaxially rigid with said first member and coaxial with the recess therein, at least one slightly arcuate catch including a rigid rounded boss integral with and projecting outwardly from its outer surface and rockably engaging the inside of the peripheral wall bounding said recess, said catch being provided with a terminal nose adapted to engage the ratchet wheel, said catch being free from direct interconnection with said second member, a second revoluble component member coaxial with the first component member and including a disc overlying the ratchet wheel and the catch and provided with a radial slot, and a pin parallel with the axis of the revoluble members, rigid with the boss of the catch and slidingly engaging the slot in the disc to allow a slight radial movement between the catch and the disc while ensuring the simultaneous progression of the first revoluble member and of the disc for that direction of rotation of the associated components for which the nose on the catch engages operatively the ratchet wheel and thereby operatively connects the disc with the latter.

References Cited in the file of this patent

UNITED STATES PATENTS

| 432,092 | Slager | July 15, 1890 |
| 1,767,593 | Laabs | June 24, 1930 |
| 2,151,417 | Blount | Mar. 21, 1939 |
| 2,409,009 | Bakke | Oct. 8, 1946 |

FOREIGN PATENTS

| 550,680 | France | Dec. 20, 1922 |